(12) United States Patent
Xi et al.

(10) Patent No.: US 10,317,768 B2
(45) Date of Patent: Jun. 11, 2019

(54) DISPLAY PANEL AND DISPLAY DEVICE

(71) Applicant: SHANGHAI AVIC OPTO ELECTRONICS CO., LTD., Shanghai (CN)

(72) Inventors: Kerui Xi, Shanghai (CN); Tingting Cui, Shanghai (CN); Zhaokeng Cao, Shanghai (CN)

(73) Assignee: SHANGHAI AVIC OPTO ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 15/811,680

(22) Filed: Nov. 14, 2017

(65) Prior Publication Data

US 2018/0067374 A1 Mar. 8, 2018

(30) Foreign Application Priority Data

May 25, 2017 (CN) .......................... 2017 1 0377725

(51) Int. Cl.
| | | |
|---|---|---|
| G02B 26/00 | (2006.01) | |
| G02F 1/167 | (2019.01) | |
| G02F 1/1333 | (2006.01) | |
| G02F 1/1362 | (2006.01) | |
| G06F 3/0488 | (2013.01) | |
| G06F 3/041 | (2006.01) | |
| G06F 3/044 | (2006.01) | |

(52) U.S. Cl.
CPC .......... *G02F 1/167* (2013.01); *G02F 1/13338* (2013.01); *G02F 1/136227* (2013.01); *G06F 3/044* (2013.01); *G06F 3/0412* (2013.01); *G06F 3/0488* (2013.01); *G02F 2201/122* (2013.01); *G06F 2203/04107* (2013.01); *G06F 2203/04112* (2013.01); *G09G 2300/0439* (2013.01)

(58) Field of Classification Search
CPC ......... G02F 1/134309; G02F 1/133707; G02F 1/133753; G02F 1/136227; G02F 1/1368; G02F 1/133308; G02F 1/133512; G02F 1/134363; G02F 2001/133757; G02F 1/13452; G02F 1/136209; G02F 1/136213; G02F 1/136286; G02F 2001/13398; G02F 2001/134318
USPC ........ 359/237, 242, 265–267, 290–292, 295, 359/296, 298
See application file for complete search history.

(56) References Cited

U.S. PATENT DOCUMENTS

| | | | |
|---|---|---|---|
| 2013/0050804 A1* | 2/2013 | No ........................... | G02F 1/167 359/296 |
| 2016/0187694 A1* | 6/2016 | Kim ...................... | G06F 3/0412 349/12 |
| 2017/0131816 A1* | 5/2017 | Zou ....................... | G06F 3/0412 |

FOREIGN PATENT DOCUMENTS

CN 1967365 A 5/2007

* cited by examiner

*Primary Examiner* — Brandi N Thomas
(74) *Attorney, Agent, or Firm* — Kilpatrick Townsend & Stockton LLP (57) ABSTRACT

Disclosed are a display panel and a display device. The display panel includes: an upper substrate, a lower substrate and an electrophoretic layer located between the upper substrate and the lower substrate; wherein, the lower substrate includes a plurality of pixel electrodes arranged in a matrix and a plurality of touch electrodes; the upper substrate includes a common electrode layer, a plurality of openings are provided on the common electrode layer, the maximum aperture of the openings is less than or equal to a space between adjacent pixel electrodes.

10 Claims, 12 Drawing Sheets

DISPLAY PANEL AND DISPLAY DEVICE

CROSS-REFERENCE TO RELATED APPLICATIONS

This application claims priority to Chinese Patent Application No. 201710377725.6, filed on May 25, 2017 and entitled "DISPLAY PANEL AND DISPLAY DEVICE", the disclosure of which is incorporated herein by reference in its entirety.

TECHNICAL FIELD

Embodiments of the present disclosure relates to electronic paper display technologies, and in particular, to a display panel and a display device.

BACKGROUND

Electronic paper display panels have the advantages such as ultrathin and portable characteristics, low power consumption and paper-like impression. With the continuous development of display technologies, electronic paper display panels are gradually applied to various display apparatuses.

An electronic paper display panel of the related art includes an upper substrate and a lower substrate that are provided opposite to each other and an electrophoretic layer located between the upper substrate and the lower substrate, and the upper substrate includes an upper backing substrate and a common electrode layer adhered onto the upper backing substrate, and the lower substrate includes a lower backing substrate, and also a thin-film transistor layer, a pixel electrode layer successively formed on the lower substrate. By applying a voltage to the common electrode layer on the upper substrate and the pixel electrode layer on the lower substrate, an electric field is formed between the common electrode layer and the pixel electrode layer, and charged particles in the electrophoretic layer between the common electrode layer and the pixel electrode layer can move under the action of the electric field, so that a corresponding image may be displayed.

SUMMARY

The present disclosure provides a display panel and a display device, thereby realizing the touch control and display of an in-cell touch electronic paper display panel.

In a first aspect, embodiments of the disclosure provide a display panel, which includes: an upper substrate, a lower substrate and an electrophoretic layer located between the upper substrate and the lower substrate; and, the lower substrate includes a plurality of pixel electrodes arranged in a matrix and a plurality of touch electrodes; the upper substrate includes a common electrode layer, a plurality of openings are provided in the common electrode layer, and the maximum aperture of the openings is less than or equal to a space between adjacent pixel electrodes.

In a second aspect, embodiments of the disclosure further provide a display device, which includes the display panel of the above first aspect.

The display panel according to the embodiments of the disclosure includes an upper substrate, a lower substrate and an electrophoretic layer located between the upper substrate and the lower substrate, and the lower substrate includes a plurality of pixel electrodes arranged in a matrix and a plurality of touch electrodes, the upper substrate includes a common electrode layer, a plurality of openings are provided in the common electrode layer, and the maximum aperture of the openings is less than or equal to the space between adjacent pixel electrodes. By providing a plurality of openings in the common electrode layer, a touch electrode located inside the display panel can detect a change in capacitance caused by a user finger during a touch operation, thereby realizing a touch function, and realizing the touch control and display of an in-cell touch electronic paper display panel.

BRIEF DESCRIPTION OF THE DRAWINGS

Drawings needed in the embodiments of the disclosure will be introduced briefly below for more clearly illustrating the technical solutions of the exemplary embodiments of the disclosure. It will be apparent that, the drawings merely illustrate exemplary embodiments of the disclosure. Those skilled in the art can conceive other drawings from the illustrated drawings without inventive efforts.

DETAILED DESCRIPTION

In order to further illustrate the technical solution of the disclosure, specific embodiments of a display panel and a method for manufacturing the same according to the disclosure, the structure, characteristics and advantages thereof will be illustrated in detail below in conjunction with the drawings and embodiments.

An embodiment of the disclosure provides a display panel, which includes:

an upper substrate, a lower substrate and an electrophoretic layer located between the upper substrate and the lower substrate; and, the lower substrate includes a plurality of pixel electrodes arranged in a matrix and a plurality of touch electrodes;

the upper substrate includes a common electrode layer, a plurality of openings are provided in the common electrode layer, and the maximum aperture of the openings is less than or equal to a space between adjacent pixel electrodes.

The display panel according to an embodiment of the disclosure includes an upper substrate, a lower substrate and an electrophoretic layer located between the upper substrate and the lower substrate, and the lower substrate includes a plurality of pixel electrodes arranged in a matrix and a plurality of touch electrodes, the upper substrate includes a common electrode layer, a plurality of openings are provided in the common electrode layer, and the maximum aperture of the openings is less than or equal to the space between adjacent pixel electrodes. By providing a plurality of openings in the common electrode layer, a touch electrode located inside the display panel can detect a change of capacitance caused by a user finger during a touch operation, thereby realizing a touch function, and realizing the touch control and display of an in-cell touch electronic paper display panel.

The above shows the core concept of the disclosure, and the technical solutions in the embodiments of the disclosure will be described clearly and fully below in conjunction with the drawings in the embodiments of the disclosure. It will be apparent that, the embodiments described are merely a part of the embodiments of the disclosure, rather than being the whole embodiments.

Many specific details will be illustrated in the description below for fully understanding the disclosure; however, the disclosure may also be implemented in other embodiments different from those described herein. It may be similarly spread by one skilled in the art without departing from the spirit of the disclosure. Therefore, the disclosure will not be limited to the embodiments disclosed below.

Next, the disclosure will be described in detail in conjunction with the drawings. In the description of the embodiments of the disclosure, for easy illustration, schematic diagrams showing the structure of a device are not partially enlarged to scale. Moreover, the schematic diagrams are exemplary only, without limiting the protection scope of the disclosure. Additionally, three-dimensional space sizes of length, width and height may be included in practical manufacture.

Figure 1:
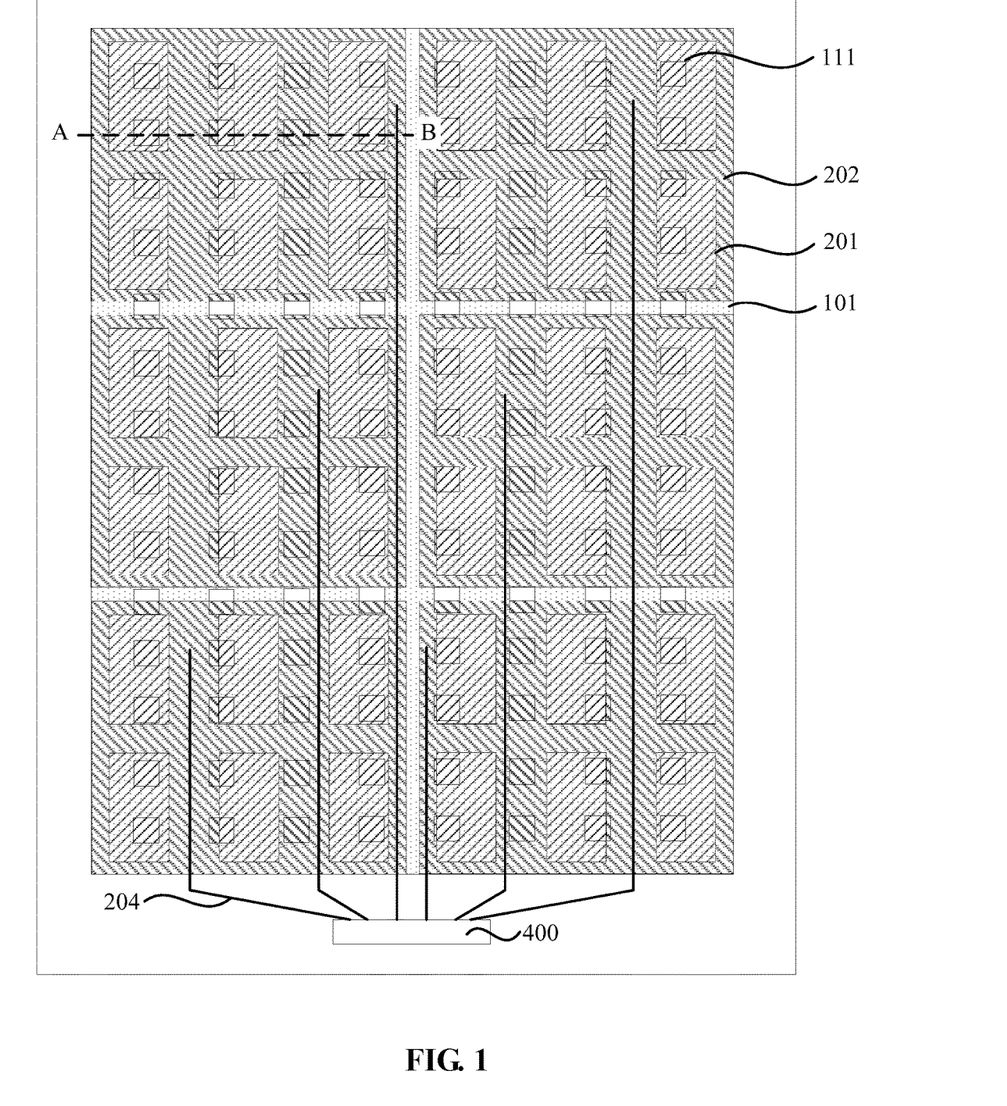
FIG. 1 is a top view showing the structure of a display panel according to an embodiment of the disclosure.
Figure 2:
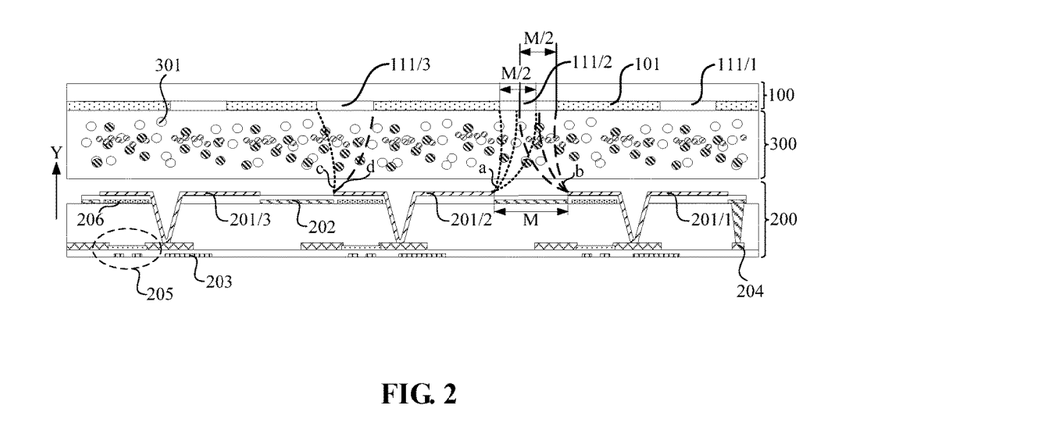
FIG. 2 is a schematic sectional view taking along dashed line AB in FIG. 1.

FIG. 1 is a top view showing the structure of a display panel according to an embodiment of the disclosure. For easily describing the related structure, FIG. 1 only shows a part of the structure of the display panel. FIG. 2 is a schematic sectional view taking along dashed line AB in FIG. 1. As shown in FIG. 2, the display panel includes an upper substrate 100, a lower substrate 200 and an electrophoretic layer 300 located between the upper substrate 100 and the lower substrate 200. Referring to FIG. 1 and FIG. 2, the lower substrate 200 includes a plurality of pixel electrodes 201 arranged in a matrix and a plurality of touch electrodes 202, the upper substrate 100 includes a common electrode layer 101, a plurality of openings 111 are provided in the common electrode layer 101, and the maximum aperture of the openings 111 is less than or equal to the space between adjacent pixel electrodes 201.

As shown in FIG. 2, for easily description, the space between adjacent pixel electrodes 201 is labelled as M. In practice, M is determined by the material of the electrophoretic layer 300, and thus the M may be determined after the material of the electrophoretic layer 300 in the display panel is determined. Generally, M is provided less than 50 μm. Exemplarily, the typical value of a trichromic film (trichromic electrophoretic film) is 42 μm. It needs to be noted that, the electrophoretic layer 300 includes a plurality of charged particles 301, the charged particles 301 can move under the action of an electric field formed by a common electrode layer 101 and a pixel electrode 201, thereby realizing the display of an image. When the space between adjacent pixel electrodes 201 is M, a lateral electric field formed by an edge of the pixel electrode 201 and the common electrode layer 101 can still realize the effective drive of the charged particles 301, so that the charged particles 301 in the region of the electrophoretic layer 300 corresponding to the gap between adjacent pixel electrodes 201 can move normally and accomplish the display of an image in the region. However, when the space between adjacent pixel electrodes 201 is larger than M, the lateral electric field formed by an edge of the pixel electrode 201 and the common electrode layer 101 cannot effectively drive the charged particles 301 anymore, thereby generating a display blind zone, which leads to an error for a part of the displayed picture.

In the technical solution of this embodiment, a plurality of openings 111 is provided in the common electrode layer 101. According to different distribution locations of the openings 111, the opening 111 have the following three relationship with the gap between adjacent pixel electrodes 201 along the lamination direction Y of the upper substrate 100 and the lower substrate 200, that is, an overlap-free relationship, an overlap relationship and a partial overlap relationship.

For the first situation, referring to FIG. 2, exemplarily, along the lamination direction Y of the upper substrate 100 and the lower substrate 200, an orthogonal projection of a first opening 111/1 is located within an orthogonal projection of a first pixel electrode 201/1. To ensure that the charged particles 301 in the region of the electrophoretic layer 300 corresponding the first opening 111/1 can be driven effectively, the aperture of the first opening 111/1 is provided less than or equal to the space M between adjacent pixel electrodes 201. The specific reason is as follows: as described above, when no opening 111 is provided in the common electrode layer 101, along the lamination direction Y of the upper substrate 100 and the lower substrate 200, an orthogonal projection of the gap between adjacent pixel electrodes 201 may be located within an orthogonal projection of the common electrode layer 101. When the space between pixel electrodes 201 is larger than M, a lateral electric field formed by an edge of the pixel electrode 201 and the common electrode layer 101 cannot accomplish the effective drive of the charged particles 301. Similarly, after the openings 111 are provided in the common electrode layer 101, along the lamination direction Y of the upper substrate 100 and the lower substrate 200, an orthogonal projection of a first opening 111/1 may be located within an orthogonal projection of a first pixel electrode 201/1, and when the aperture of the first opening 111/1 is larger than M, likewise, a lateral electric field formed by an edge of the pixel electrode 201 and the common electrode layer 101 cannot accomplish the effective drive of the charged particles 301. Other openings 111 on the common electrode layer 101 may have the same situations as the first opening 111/1. In order to ensure that all the charged particles 301 in the whole display picture can be driven effectively, the maximum aperture of the openings 111 is provided less than or equal to the space M between adjacent pixel electrodes 201.

For the second situation, still referring to FIG. 2, exemplarily, along the lamination direction Y of the upper substrate 100 and the lower substrate 200, an orthogonal projection of a second opening 111/2 is located within an orthogonal projection of the gap between the first pixel electrode 201/1 and the second pixel electrode 201/2. A first edge electric field a is formed by the right edge of the second pixel electrode 201/2 and the left edge of the second opening 111/2, and a second edge electric field b is formed by the left edge of the first pixel electrode 201/1 and the right edge of the second opening 111/2. It has been found that, the effective extension distance of both the first edge electric field a and the second edge electric field b is one-half of the space M between adjacent pixel electrodes 201, namely, M/2. Specifically, the effective extension distance refers to the length of a region in which the corresponding charged particles 301 can be driven effectively. Therefore, if the aperture of the second opening 111/2 is provided larger than the space M between adjacent pixel electrodes 201, it would cause the charged particles 301 within a part of the region unable to be effectively driven, thereby affecting the display of the display panel. As a result, the aperture of the second opening 111/2 is provided less than or equal to the space M between adjacent pixel electrodes 201. Other openings 111 in the common electrode layer 101 may have the same situation as the second opening 111/2. In order to ensure that all the charged particles 301 in the whole display picture can be driven effectively, the maximum aperture of the openings 111 is provided less than or equal to the space M between adjacent pixel electrodes 201.

For the third situation, still referring to FIG. 2, exemplarily, along the lamination direction Y of the upper substrate 100 and the lower substrate 200, an orthogonal projection of a third opening 111/3 is partially overlapped with an orthogonal projection of the gap between the second pixel electrode 201/2 and the third pixel electrode 201/3. In such a case, a third edge electric field c can be formed by the left edge of the second pixel electrode 201/2 and the left edge of the third opening 111/3, and a fourth edge electric field d can be formed by the left edge of the second pixel electrode 201/2 and the right edge of the third opening 111/3. Likewise, the maximum extendable distance of each of the third edge electric field c and the fourth edge electric field d is still one-half of the space M between adjacent pixel electrodes 201, namely, M/2 (not labelled repeatedly here). However, at this time, because the distance between the third opening 111/3 and the third pixel electrode 201/3 is large, an edge electric field formed by the right edge of the third pixel electrode 201/3 and the left edge of the third opening 111/3 cannot effectively drive the charged particles 301 within the corresponding region, and the distance between the right edge of the third pixel electrode 201/3 and the right edge of the third opening 111/3 is larger than the distance between the right edge of the third pixel electrode 201/3 and the left edge of the third opening 111/3. When the edge electric field formed by the right edge of the third pixel electrode 201/3 and the left edge of the third opening 111/3 cannot effectively drive the charged particles 301 within the corresponding region, it may be much more difficult for the edge electric field formed by the right edge of the third pixel electrode 201/3 and the right edge of the third opening 111/3 to effectively drive the charged particles 301 within the corresponding region. Therefore, the aperture of the third opening 111/3 is essentially only limited by the effective drive range of the third edge electric field c and the fourth edge electric field d formed by the edges of the third opening 111/3 and the left edge of the second pixel electrode 201/2. As described above, the maximum extendable distances of each of the third edge electric field c and the fourth edge electric field d is one-half of the space M between adjacent pixel electrodes 201, namely, M/2. Thus, similarly, the aperture of the third opening 111/1 is provided less than or equal to the space M between adjacent pixel electrodes 201. Other openings 111 on the common electrode layer 101 have the same situations as the third opening 111/3. To ensure that all the charged particles 301 in the whole display picture can be driven effectively, the maximum aperture of the openings 111 is provided less than or equal to the space M between adjacent pixel electrodes 201.

In summary, in order to ensure that all the charged particles 301 within the whole display region can be driven effectively, the maximum apertures of the openings 111 provided at any location each need to be provided less than or equal to the space between adjacent pixel electrodes 201.

The display panel according to this embodiment includes an upper substrate 100, a lower substrate 200 and an electrophoretic layer 300 located between the upper substrate 100 and the lower substrate 200, and, the lower substrate 200 includes a plurality of pixel electrodes 201 arranged in a matrix and a plurality of touch electrodes 202, the upper substrate 100 includes a common electrode layer 101, a plurality of openings 111 are provided in the common electrode layer 101, the maximum aperture of the openings 111 is less than or equal to the space between adjacent pixel electrodes 201. A plurality of openings 111 in the common electrode layer 101 are provided, so that during a touch operation, a change in capacitance caused by a user finger can be detected by a touch electrode located inside the display panel 202, thereby realizing a touch function, and realizing display of an in-cell touch electronic paper display panel.

As shown in FIG. 2, the display panel further includes another common electrode layer 203 provided on the lower substrate 200, which is configured to form a storage capacitor with the pixel electrode 201 and improve the performance of the display of the display panel.

Exemplarily, the touch electrode 202 may include a plurality of self-capacitance touch electrode blocks, and in this case, the display panel is a self-capacitance touch display panel. In one embodiment, the touch electrode 202 may also include a plurality of touch driven electrode blocks and a plurality of touch sensing electrode blocks, and in this case, the display panel is a mutual-capacitance touch display panel.

Figure 3:
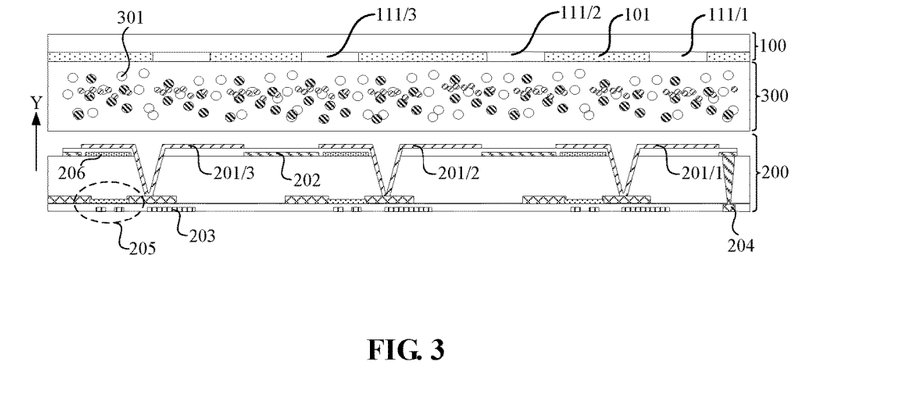
FIG. 3 is another schematic sectional view taking along dashed line AB in FIG. 1.

As shown in FIG. 1 and FIG. 2, the lower substrate 200 may further include a plurality of touch signal lines 204 and a control chip 400, and the plurality of touch signal lines 204 are electrically connected with the plurality of touch electrodes 202, respectively and also electrically connected with the control chip 400. In one embodiment, for simplifying the preparation process of the display panel, the touch signal line 204 may be provided in the same layer as the source and drain electrodes of a thin-film transistor 205 in the lower substrate 200, as shown in FIG. 2. The touch signal line 204 may also be provided in the same layer as the gate electrode of the thin-film transistor 205 in the lower substrate 200, as shown in FIG. 3. Under the condition that electrical connection between the touch signal line 204 and the control chip 400 can be realized, in this embodiment, the film layer including the touch signal line 204 is not limited to the case shown in FIG. 2 and FIG. 3, but may be further adjusted as needed.

In one embodiment, the maximum aperture of the openings 111 may be one-half of the space between adjacent pixel electrodes 201. As described above, the maximum effective extension length of an edge electric field formed by the edge of an opening 111 and the edge of an adjacent pixel electrode 201 is one-half of the space between adjacent pixel electrodes 201 (i.e., M/2). The maximum aperture of the openings 111 is set as one-half of the space between adjacent pixel electrodes 201, so that the charged particles 301 in the region of the electrophoretic layer 300 corresponding to the opening 111 can be driven by two edge electric fields simultaneously, thereby realizing more flexible movement. It has been found that, when the maximum aperture of the openings 111 is less than one-half of the space between adjacent pixel electrodes 201, the two edge electric fields formed by the edge of adjacent pixel electrodes 201 and the edge of the openings 111 applies a large acting force on the charged particles 301 in the region of the electrophoretic layer 300 corresponding to the opening 111, so that the charged particles 301 within the region corresponding to the openings 111 is much possibly uncontrollable, thereby affecting the normal display of the display panel. When the maximum aperture of the openings 111 is larger than one-half of the space between adjacent pixel electrodes 201, a part of the charged particles 301 within the region of the electrophoretic layer 300 corresponding to the opening 111 may be driven only by one edge electric field, so that the movement flexibility may be lower than that in the case in which the maximum aperture of the openings 111 is one-half of the space between adjacent pixel electrodes 201.

As shown in FIG. 1, the total area of the plurality of openings 111 may be less than or equal to 50% of the total area of the common electrode layer 101. If the total area of the plurality of openings 111 is too large, no effective drive electric field can be formed between the common electrode layer 101 and the pixel electrode 201, causing the affection on the normal display of the display panel. If the total area of the plurality of openings 111 is too small, on one hand, the detection of the touch electrode on the change in capacitance caused by a user finger may be affected; on the other hand, the charged particles 301 within a part of the region is much possibly uncontrollable, as the above specific principle.

In one embodiment, referring to FIG. 1, the shape of the openings 111 may be a rectangle. It needs to be noted that, in other implementation modes of this embodiment, the shape of the openings 111 may also be an ellipse, a circle, a trapezoid, a triangle or a semicircle. It may be understood that, the openings 111 function to alleviate the shielding action of the common electrode layer 101, so that the touch electrode 202 can detect the change in capacitance caused by a user finger, thereby realizing a touch function. Therefore, the openings 111 with various shapes each can achieve the above effects, and hence the openings 111 is not limited to the above several shapes, and may also be any other shapes that can realize the function of the openings 111, which is not specifically limited here.

Still referring to FIG. 1 and FIG. 2, the touch electrode 202 may have a mesh structure. Moreover, along the lamination direction Y of the upper substrate 100 and the lower substrate 200, the orthogonal projection of wirings in the mesh structure may be located within an orthogonal projection of the gap between adjacent pixel electrodes 201. By such an arrangement, the pixel electrode 201 may not be overlapped with the touch electrode 202 in the lamination direction Y of the upper substrate 100 and the lower substrate 200, thereby avoiding the mutual affection between the pixel electrode 201 and the touch electrode 202. It needs to be noted that, The arrangement that the orthogonal projection of wirings in the mesh structure is located within an orthogonal projection of the gap between adjacent pixel electrodes 201 includes two cases as follows: in the first case, along the lamination direction Y of the upper substrate 100 and the lower substrate 200, the orthogonal projection of wirings in the mesh structure is overlapped with the orthogonal projection of the gap between adjacent pixel electrodes 201; in the second case, along the lamination direction Y of the upper substrate 100 and the lower substrate 200, the orthogonal projection of wirings in the mesh structure falls within the orthogonal projection of the gap between adjacent pixel electrodes 201.

The display panel structure in FIG. 1 and FIG. 2 shows the above first situation. By such an arrangement, given that the pixel electrode 201 and the touch electrode 202 have no overlapped part in the lamination direction Y of the upper substrate 100 and the lower substrate 200, the touch electrode 202 can cover the gap between adjacent pixel electrodes 201 to the maximum extent, thereby ensuring that the touch electrode 202 can take the maximum effective area to detect the change in capacitance caused by a user finger.

In FIG. 2, the lower substrate 200 further includes a plurality of thin-film transistors 205 each connected with one of the pixel electrodes 201 (that is, the thin-film transistors 205 are connected with the pixel electrodes 201 in a one-to-one relationship) and a light-shielding metal layer 206 located on one side of plurality of thin-film transistors 205 that is adjacent to the upper substrate 100, and the light-shielding metal layer 206 at least covers the plurality of thin-film transistors 205, and the plurality of touch electrodes 202 may be provided on the same layer as the light-shielding metal layer 206.

It needs to be noted that, the light-shielding metal layer 206 includes a plurality of light-shielding metal blocks, each light-shielding metal block covers one thin-film transistor 205 in the lamination direction Y of the upper substrate 100 and the lower substrate 200, as shown in FIG. 2. The light-shielding metal layer 206 can block an incident light from the side of the upper substrate 100 from irradiating on the thin-film transistor 205, in order to avoid a leakage current of the thin-film transistor 205 generated by light irradiation, thus ensuring a normal operation of the display panel. In one embodiment, the thin-film transistor 205 may be two thin-film transistors connected in series, as shown in FIG. 2. The leakage current of two serially connected thin-film transistors is less than that of a single thin-film transistor, which helps improving the overall display performance of the display panel. In other implementation modes of this embodiment, the thin-film transistor 205 may also be a single thin-film transistor. Likewise, a single thin-film transistor can realize the function of switching on and off of an apparatus to operate the display panel normally. It should be noted that, the thin-film transistor 205 in this embodiment is a bottom-gate thin-film transistor in which the gate electrode can block an incident light (from one side of the lower substrate 200 that is facing away from the upper substrate 100) from irradiating on the channel region of the thin-film transistor 205, thereby preventing the leakage current of the thin-film transistor 205 from being increased due to light irradiation.

Exemplarily, in order to simplify the preparation process of the display panel, when a plurality of touch electrodes 202 are provided on the same layer as the light-shielding metal layer 206, the plurality of touch electrodes 202 may be formed in the same process step as the light-shielding metal layer 206.

Figure 4:
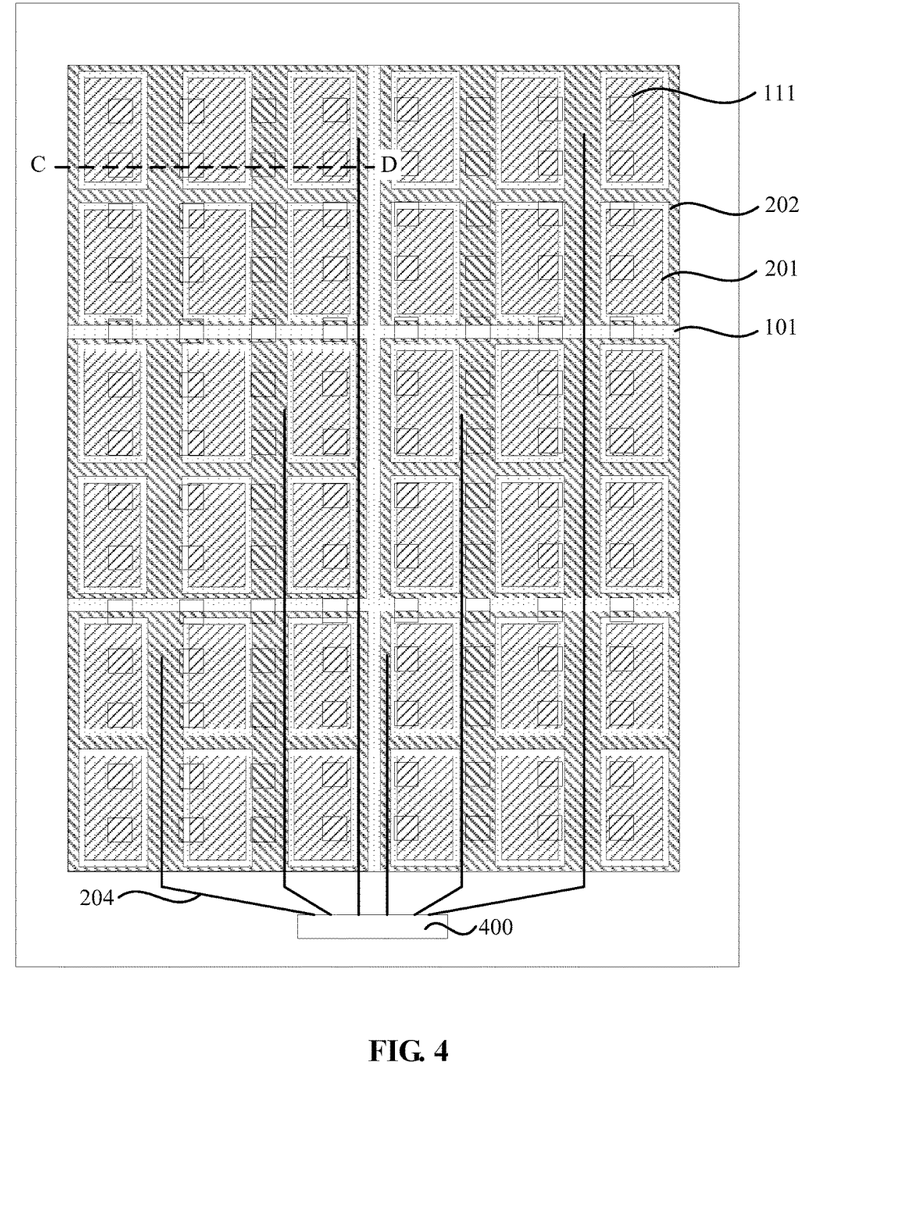
FIG. 4 is a top view showing the structure of another display panel according to an embodiment of the disclosure.
Figure 5:
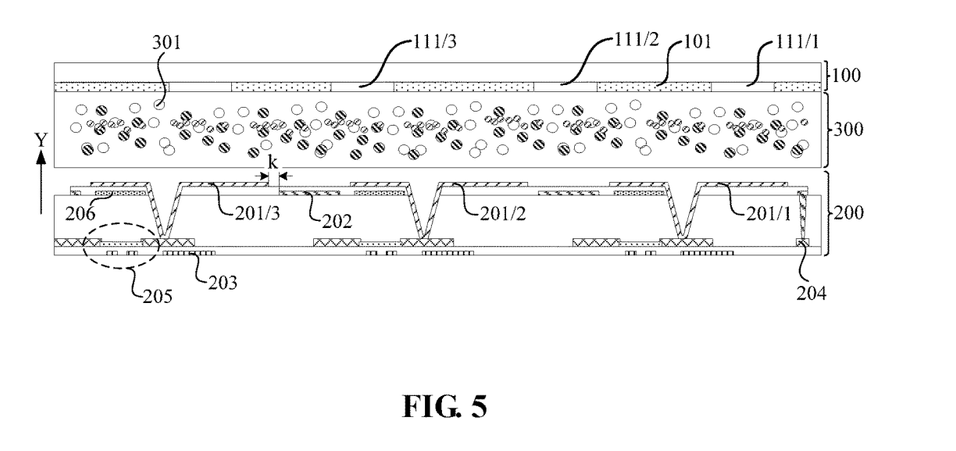
FIG. 5 is a schematic sectional view taken along dashed line CD in FIG. 4.

FIG. 4 is a top view showing the structure of another display panel according to an embodiment of the disclosure, and FIG. 5 is a schematic sectional view taken along dashed line CD in FIG. 4. The display panel structure in FIG. 4 and FIG. 5 shows one type of the above second situation. As shown in FIG. 4 and FIG. 5, a gap k is present between the pixel electrode 201 and the touch electrode 202 on the direction vertical to the lamination direction Y of the upper substrate 100 and the lower substrate 200. By such an arrangement, an overlapped part between wirings in the mesh structure and the pixel electrode 201 in the lamination direction Y of the upper substrate 100 and the lower substrate 200 due to problems such as process error can be avoid, so that signals of the pixel electrode 201 and the touch electrode 202 may not be mutually affected. It needs to be noted that, in FIG. 4 and FIG. 5, along a direction vertical to the extension direction of wirings in the mesh structure, a gap k is present between each of the two edges of wirings and the adjacent pixel electrodes 201 in the direction vertical to the lamination direction Y of the upper substrate 100 and the lower substrate 200. In other implementation modes of this embodiment, along a direction vertical to the extension direction of wirings in the mesh structure, it may also be possible that a gap is present between one of the two edges of wirings in the mesh structure and an adjacent pixel electrode 201 in the direction vertical to the lamination direction Y of the upper substrate 100 and the lower substrate 200 and the other edge is overlapped with an adjacent pixel electrode 201 in the lamination direction Y of the upper substrate 100 and the lower substrate 200. By such an arrangement, the gap is present between at least one of the edges of wirings in the mesh structure and the adjacent pixel electrodes 201 in the direction vertical to the lamination direction Y of the upper substrate 100 and the lower substrate 200, so that an overlapped part between the wirings in the mesh structure and the pixel electrode 201 in the lamination direction Y of the upper substrate 100 and the lower substrate 200 due to problems such as process error can be avoid.

Figure 6:
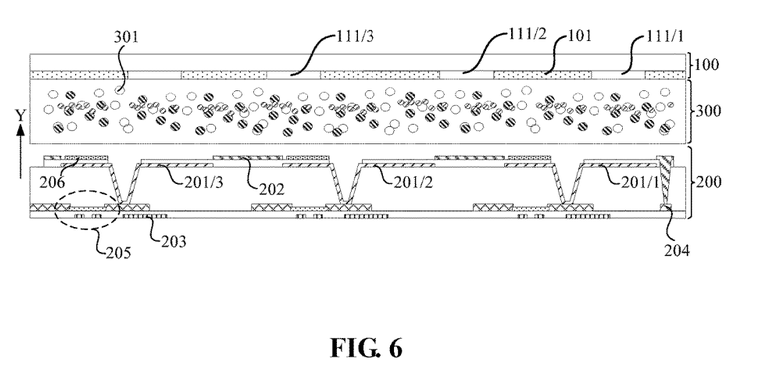
FIG. 6 is another schematic sectional view taking along dashed line AB in FIG. 1.
Figure 7:
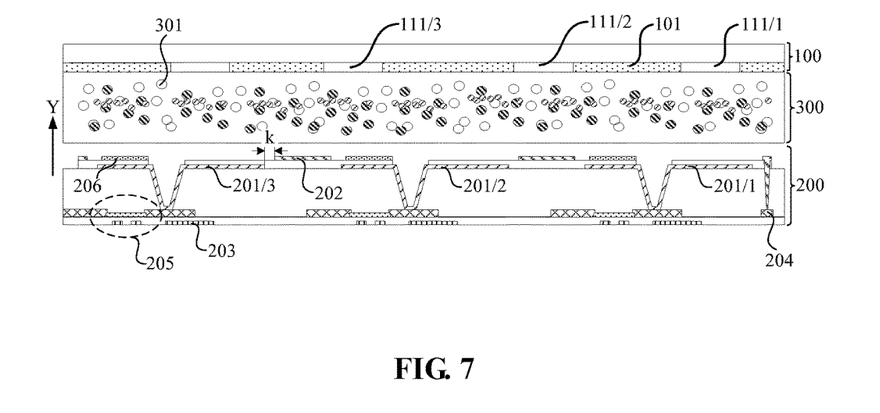
FIG. 7 is another schematic sectional view taken along dashed line CD in FIG. 4.

It needs to be noted that, for the display panel structure in which the orthogonal projection of wirings in the mesh structure in the lamination direction Y of the upper substrate 100 and the lower substrate 200 is located within the orthogonal projection of the gap between adjacent pixel electrodes 201, the pixel electrode 201 and the touch electrode 202 is not overlapped with in the lamination direction Y of the upper substrate 100 and the lower substrate 200, and hence no mutual phase interference may exists between the pixel electrode 201 and the touch electrode 202. Therefore, the touch electrode 202 may be provided on one side of the pixel electrode 201 that is facing away from the upper substrate 100, as shown in FIG. 2 and FIG. 5. The touch electrode 202 may also be provided on one side of the pixel electrode 201 that is adjacent to the upper substrate 100, as shown in FIG. 6 and FIG. 7. It may be understood that, when there is a gap between the pixel electrode 201 and the touch electrode 202 in the direction vertical to the lamination direction Y of the upper substrate 100 and the lower substrate 200, the touch electrode 202 may also be provided on the same layer as the pixel electrode 201, and in this case, there is no directly contacted part between the touch electrode 202 and the pixel electrode 201, so that the signals with respect to the touch electrode 202 and the pixel electrode 201 may likewise not interfere with each other.

Figure 8:
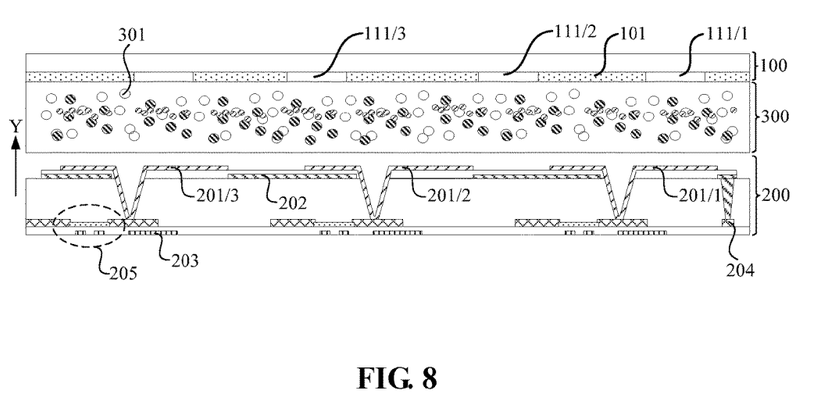
FIG. 8 is a schematic sectional view of a display panel according to an embodiment of the disclosure.
Figure 9:
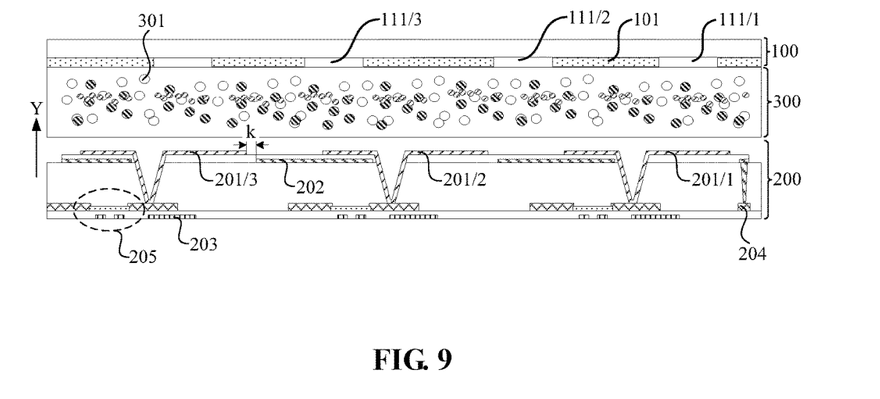
FIG. 9 is another schematic sectional view of a display panel according to an embodiment of the disclosure.

Exemplarily, based on the display panel structure shown in FIG. 2 or FIG. 5, the wirings in the mesh structure can be extended above the corresponding thin-film transistor 205, so that in the lamination direction Y of the upper substrate 100 and the lower substrate 200, the above-mentioned thin-film transistor 205 can be covered by the extended part, as shown in FIG. 8 and FIG. 9. Generally, the touch electrode 202 is formed of a light-tight metal material, and thus in the structure shown in FIG. 8 and FIG. 9, the mesh structure can block the light from irradiating on the thin-film transistor 205, and no additional light-shielding metal layer needs to be provided, thereby simplifying the preparation process of the display panel.

Figure 10:
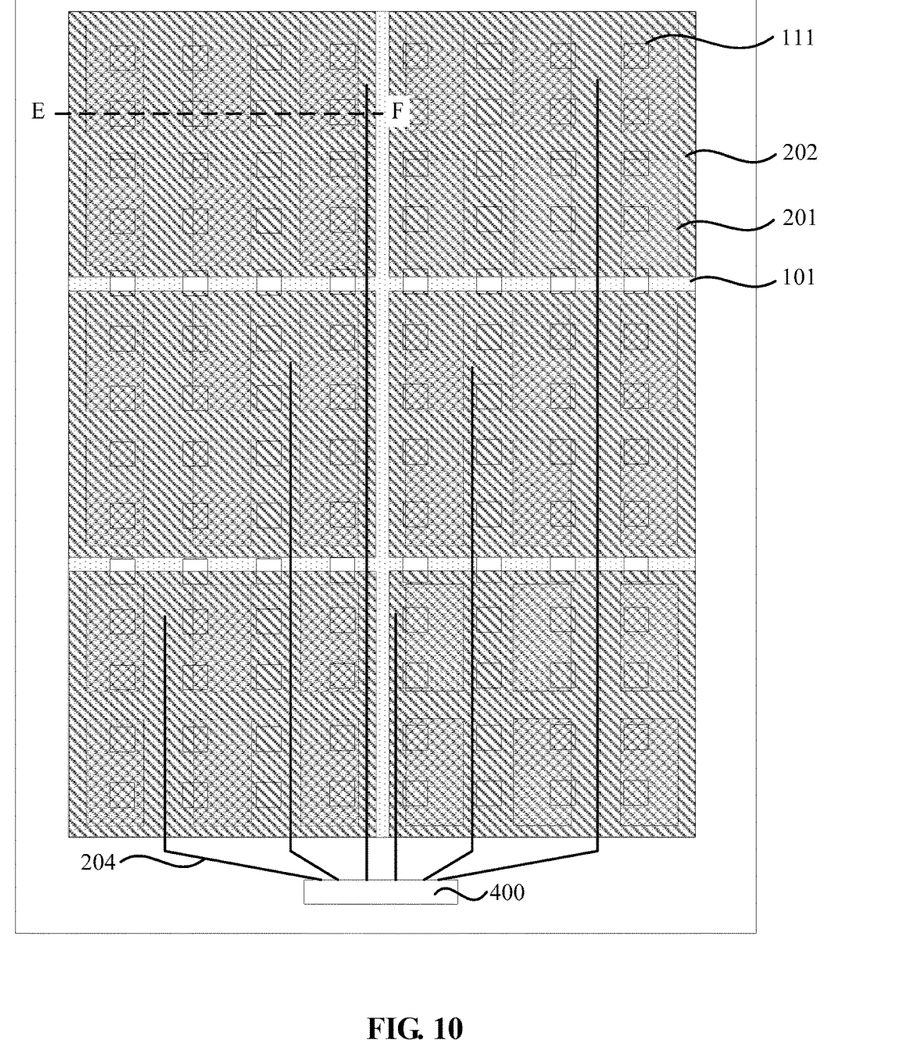
FIG. 10 is a top view showing the structure of another display panel according to an embodiment of the disclosure.
Figure 11:
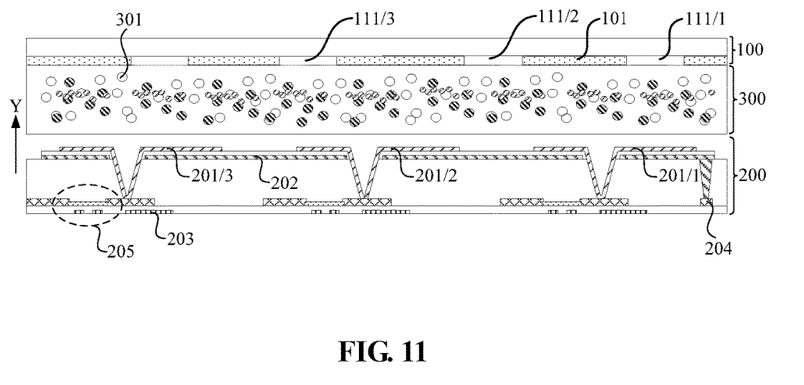
FIG. 11 is a schematic sectional view taken along dashed line EF in FIG. 10.

FIG. 10 is a top view showing the structure of another display panel according to an embodiment of the disclosure, and FIG. 11 is a schematic sectional view taken along dashed line EF in FIG. 10. As shown in FIG. 11, the display panel includes an upper substrate 100, a lower substrate 200 and an electrophoretic layer 300 located between the upper substrate 100 and the lower substrate 200. Referring to FIG. 10 and FIG. 11, the lower substrate 200 includes a plurality of pixel electrodes 201 arranged in a matrix and a plurality of touch electrodes 202, the upper substrate 100 includes a common electrode layer 101, a plurality of openings 111 are provided in the common electrode layer 101, and the maximum aperture of the openings 111 is less than or equal to the space between adjacent pixel electrodes 201, and the touch electrode 202 has a block-shaped structure.

It needs to be noted that, as shown in FIG. 11, along the lamination direction Y of the upper substrate 100 and the lower substrate 200, the orthogonal projection of a plurality of pixel electrodes 201 falls within the orthogonal projection of the same touch electrode 202. The pixel electrode 201 is electrically connected with a drain electrode of the thin-film transistor 205 by a via hole, and the touch electrode 202 with a block-shaped structure is provided with an opening corresponding to the via hole. In comparison with the mesh structure, it is easier to design and prepare a touch electrode 202 with a block-shaped structure, and the process can be simplified.

Still referring to FIG. 11, the touch electrode 202 may be provided on one side of the plurality of pixel electrodes 201 that is facing away from the upper substrate 100. If the touch electrode 202 is provided on one side of the plurality of pixel electrodes 201 that is adjacent to the upper substrate 100, the touch electrode 202 with a block-shaped structure may totally cover the pixel electrode 201 in the lamination direction Y of the upper substrate 100 and the lower substrate 200. In the display stage, when a voltage is applied to the common electrode layer 101 and the pixel electrode 201 to form an electric field, the conductive touch electrode 202 may affect the intensity of the electric field between the common electrode layer 101 and the pixel electrode 201; and in the touch stage, the display panel usually needs to display a certain picture, and at this time, the voltage applied to the touch electrode 202 may affect the charged particles 301 in the electrophoretic layer 300, so that the picture being displayed by the display panel may be changed, causing a poor user experience. However, when the touch electrode 202 is provided on one side of a plurality of pixel electrodes 201 that is facing away from the upper substrate 100, in the touch stage, the affection of the voltage applied on the touch electrode 202 on display may be relatively small; and in the display stage, the touch electrode 202 is not provided between the common electrode layer 101 and the pixel electrode 201, and the affection on display may also be relatively small. In summary, in this embodiment, the touch electrode 202 is provided on one side of the pixel electrode 201 that is facing away from the upper substrate 100. Similarly, in order to prevent the touch electrode 202 from largely effecting the display of the display panel in the display stage, the arrangement that the wirings in the mesh structure is extended above the corresponding thin-film transistor 205 based on the display panel structure shown in FIG. 6 and FIG. 7 is not provided.

It needs to be noted that, the touch electrode 202 with a block-shaped shape can cover, in the lamination direction Y of the upper substrate 100 and the lower substrate 200, the region including a plurality of pixel electrodes 201 and further including the thin-film transistor 205 having a connection relation with the plurality of pixel electrodes 201. Besides, the touch electrode 202 is generally formed of a light-tight metal material. Therefore, the touch electrode 202 in such a structure is multiplexed as the light-shielding metal layer, and hence no additional light-shielding metal layer is required.

In FIG. 1 to FIG. 11, the touch electrode 202 and the pixel electrode 201 is isolated by an insulating layer. It needs to be noted that, FIG. 1 to FIG. 11 are merely examples for illustrating the technical solutions of the disclosure, and in other embodiments, the touch electrode 202 may also be provided in other film layers above the lower substrate 200, as long as the touch electrode 202 can be insulated with other conducting structures. Additionally, the number and arrangement mode of the touch electrodes 202 and the pixel electrodes 201 included in the display panel is not limited to those shown in FIG. 1 to FIG. 11, and it can be reasonably adjusted as necessary.

Figure 12:
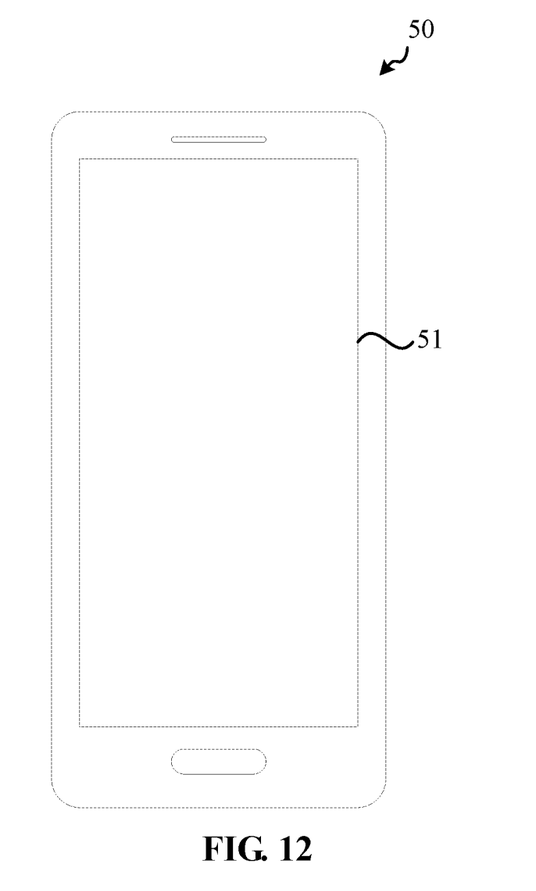
FIG. 12 is a structural representation of a display device according to an embodiment of the disclosure.

FIG. 12 is a structural representation of a display device according to an embodiment of the disclosure. As shown in FIG. 12, the display device 50 includes the display panel 51 according to any of the above embodiments of the disclosure.

It should be noted that the embodiments of the present disclosure and the technical principles used therein are described as above. It should be appreciated that the disclosure is not limited to the particular embodiments described herein, and any apparent alterations, modification and substitutions can be made without departing from the scope of protection of the disclosure. Accordingly, while the disclosure is described in detail through the above embodiments, the disclosure is not limited to the above embodiments and can further include other additional embodiments without departing from the concept of the disclosure.

What is claimed is:

1. A display panel, comprising:
an upper substrate, a lower substrate and an electrophoretic layer located between the upper substrate and the lower substrate;
wherein the lower substrate comprises a plurality of pixel electrodes arranged in a matrix and a plurality of touch electrodes, wherein each of the plurality of touch electrodes has a mesh structure, and along a lamination direction of the upper substrate and the lower substrate, an orthogonal projection of wirings in the mesh structure is located within an orthogonal projection of a gap between adjacent pixel electrodes;
wherein the upper substrate comprises a common electrode layer, a plurality of openings are provided in the common electrode layer, and the maximum aperture of the openings is less than or equal to a space between adjacent pixel electrodes;
wherein the lower substrate further comprises a plurality of thin-film transistors each connected with one of the plurality of pixel electrodes, and a light-shielding metal layer located on one side of the plurality of thin-film transistors that is adjacent to the upper substrate;
wherein the light-shielding metal layer at least covers the plurality of thin-film transistors, and the plurality of touch electrodes are provided on the same layer as the light-shielding metal layer.

2. The display panel as claimed in claim 1, wherein the maximum aperture of the openings is one-half of the space between adjacent pixel electrodes.

3. The display panel as claimed in claim 1, wherein a total area of the plurality of openings is less than or equal to 50% of a total area of the common electrode layer.

4. The display panel as claimed in claim 1, wherein the plurality of touch electrodes are formed in the same process step as the light-shielding metal layer.

5. The display panel as claimed in claim 1, wherein the lower substrate further comprises a plurality of touch signal lines and a control chip, the plurality of touch signal lines are electrically connected with the plurality of touch electrodes, respectively, and are electrically connected with the control chip.

6. The display panel as claimed in claim 1, wherein the touch electrodes are provided on one side of the plurality of pixel electrodes that is facing away from the upper substrate.

7. The display panel as claimed in claim 1, wherein a shape of the openings is one of more of: a rectangle, an ellipse, a circle, a trapezoid, a triangle, and a semicircle.

8. The display panel as claimed in claim 1, wherein each of the plurality of touch electrodes comprises a plurality of self-capacitance touch electrode blocks.

9. The display panel as claimed in claim 1, wherein each of the plurality of touch electrodes comprises a plurality of touch driven electrode blocks and a plurality of touch sensing electrode blocks.

10. A display device, comprising:
a display panel, comprising:
an upper substrate, a lower substrate and an electrophoretic layer located between the upper substrate and the lower substrate;
wherein the lower substrate comprises a plurality of pixel electrodes arranged in a matrix and a plurality of touch electrodes, wherein each of the plurality of touch electrodes has a mesh structure, and along a lamination direction of the upper substrate and the lower substrate, an orthogonal projection of wirings in the mesh structure is located within an orthogonal projection of a gap between adjacent pixel electrodes;
wherein the upper substrate comprises a common electrode layer, a plurality of openings are provided in the common electrode layer, and the maximum aperture of the openings is less than or equal to a space between adjacent pixel electrodes;
wherein the lower substrate further comprises a plurality of thin-film transistors each connected with one of the plurality of pixel electrodes, and a light-shielding metal layer located on one side of the plurality of thin-film transistors that is adjacent to the upper substrate;
wherein the light-shielding metal layer at least covers the plurality of thin-film transistors, and the plurality of touch electrodes are provided on the same layer as the light-shielding metal layer.

* * * * *